Nov. 14, 1967 R. J. HAMMOND 3,352,562

RECORD CHANGER SPINDLE

Filed Sept. 3, 1965 5 Sheets-Sheet 1

Inventor
Robert J. Hammond
By Brown, Jackson, Boettcher & Dienner Att'ys

Nov. 14, 1967 R. J. HAMMOND 3,352,562

RECORD CHANGER SPINDLE

Filed Sept. 3, 1965 5 Sheets-Sheet 2

Inventor
Robert J. Hammond
By Brown, Jackson,
Boettcher & Dienner Att'ys.

RECORD CHANGER SPINDLE

Filed Sept. 3, 1965 5 Sheets-Sheet 3

Inventor
Robert J. Hammond
By Brown, Jackson,
Boettcher & Dienner Att'ys.

Inventor
Robert J. Hammond
By Brown, Jackson,
Boettcher & Dienner Att'ys.

Nov. 14, 1967 R. J. HAMMOND 3,352,562

RECORD CHANGER SPINDLE

Filed Sept. 3, 1965 5 Sheets-Sheet 5

Inventor
Robert J. Hammond
By Brown, Jackson, Boettcher & Dienner Att'ys.

United States Patent Office 3,352,562

Patented Nov. 14, 1967

3,352,562
RECORD CHANGER SPINDLE

Robert J. Hammond, Stevensville, Mich., assignor to V-M Corporation, Benton Harbor, Mich., a corporation of Michigan Filed Sept. 3, 1965, Ser. No. 484,859
10 Claims. (Cl. 274—10)

The present invention relates to a record changer of the type where the turntable is inclined at a substantial angle from a horizontal plane in order to render the record changer more compact with respect to its overall depth dimension and thereby adapt it for advantageous use in conjunction with certain phonograph consoles and also for use in portable phonographs. More specifically, the present invention relates to a rotatable spindle for use with a record changer of the foregoing type, and to mechanism embodied in the spindle for releasing records one at a time down the spindle to a turntable for playing and for gripping a record disposed in playing position on the turntable to assure conjoint rotation of the record and the turntable.

In a conventional record changer the turntable is disposed in a horizontal plane and the spindle is perpendicular thereto and extends upwardly through the turntable along a vertical axis. However, it is known to incline a record changer so that the turntable is disposed at a substantial angle to a horizontal plane in order to provide certain dimensional advantages with respect to housing the record changer in a relatively thin cabinet. In the particular embodiment to be described herein the turntable is oriented at an angle of 13 degrees from a vertical plane, and thus the record changer spindle extends at an angle of 13 degrees from the horizontal. It is of course obvious that varying angular positions of the record changer will be found desirable depending on the particular application, and the record changer spindle of the present invention is intended for use in any application where the spindle is rotatable and is disposed at a substantial angle from the conventional vertical position.

The record changer spindle of the present invention is of the type which rotates conjointly with the turntable, and gripping means is embodied in the spindle for engagement with a record in playing position on the turntable to assure that such a record rotates with the turntable even though the downward force of gravity which acts on the record is reduced due to the orientation of the turntable.

It is thus a general object of the present invention to provide an improved record changer spindle of the type which rotates conjointly with the turntable and is disposed at a substantial angle from the vertical.

A more specific object of the invention is to provide a record changer spindle as last above-mentioned having an improved mechanism for releasing one record at a time down the spindle to the turntable for playing.

A further object of the invention is to provide a rotatable record changer spindle having improved gripping means embodied therein for gripping a record in playing position on the turntable and thereby assuring that the record rotates conjointly with the turtable.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

Figures 6, 7, 9:
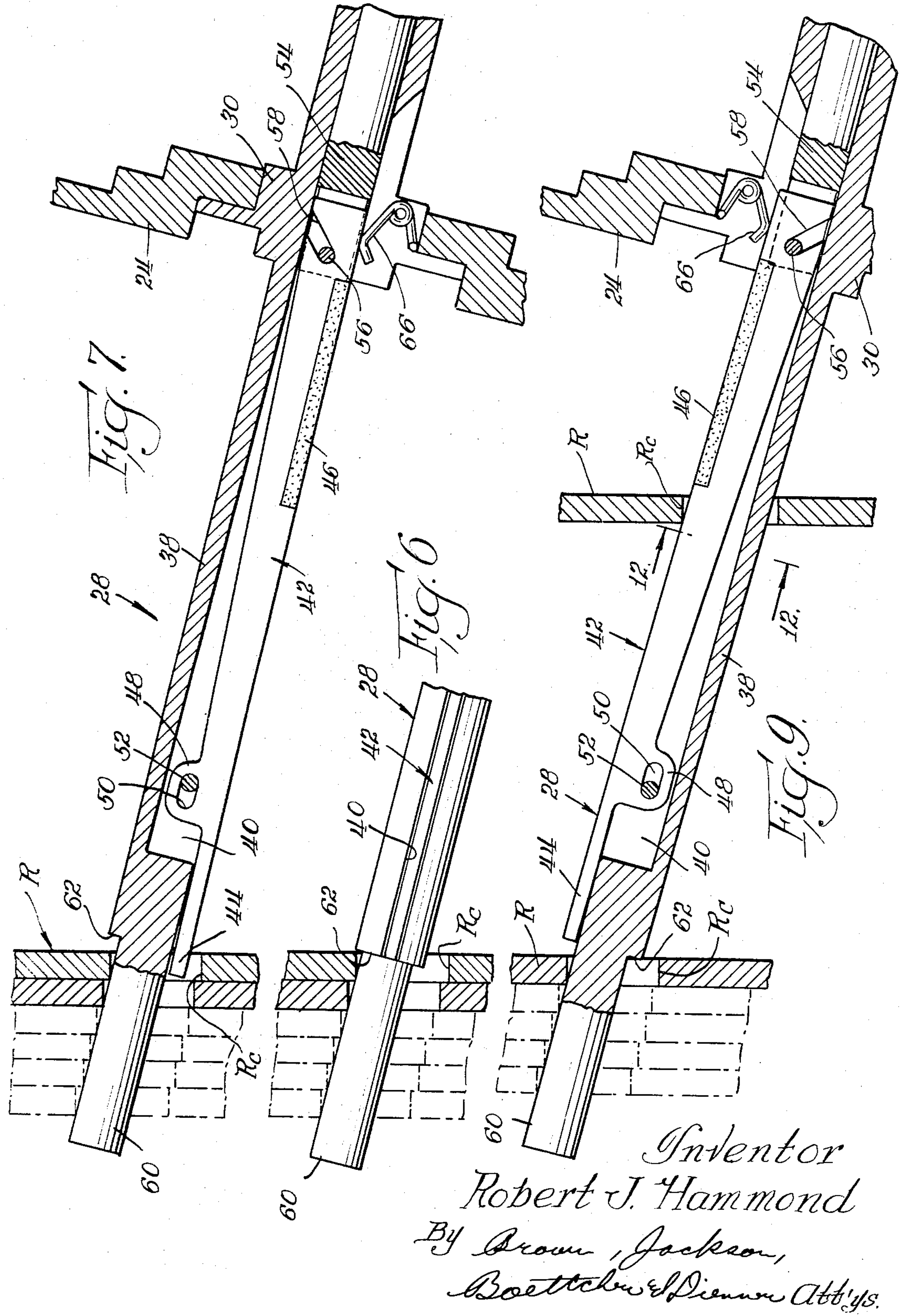
FIGURE 6 is a fragmentary elevational view showing the upper end portion of the record changer spindle rotated 90 degrees from the position of FIGURE 2 with the record feeding member still disposed in its retracted inoperative position.
FIGURE 7 is an enlarged fragmentary vertical sectional view similar to FIGURE 2 showing the record feeding member axially extended to its operative position wherein the end thereof projects into the centerhole of the lowermost record on the upper storage portion of the spindle.
Figure 12:
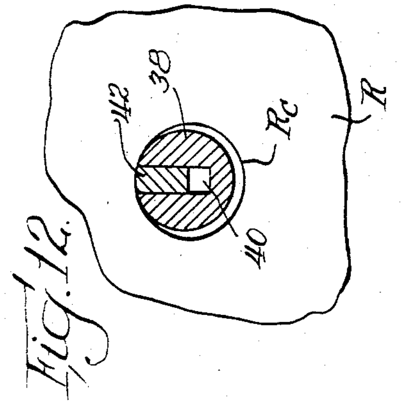
Figure 11:
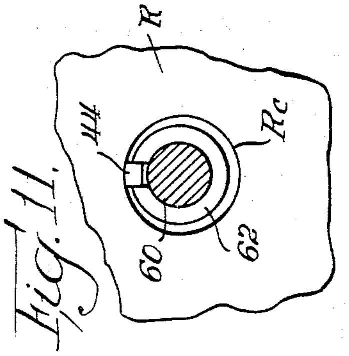
Figure 8:
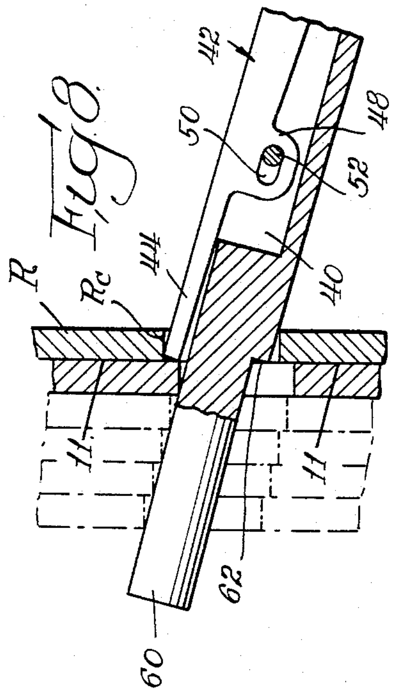
FIGURE 8 is a fragmentary vertical sectional view showing the upper end of the record changer spindle rotated 180 degrees from the position of FIGURE 7 with the record feeding member operatively extended so as to lift the lowermost record on the upper storage portion of the spindle and thereby release the record down the spindle to the turntable for playing.
Figure 10:
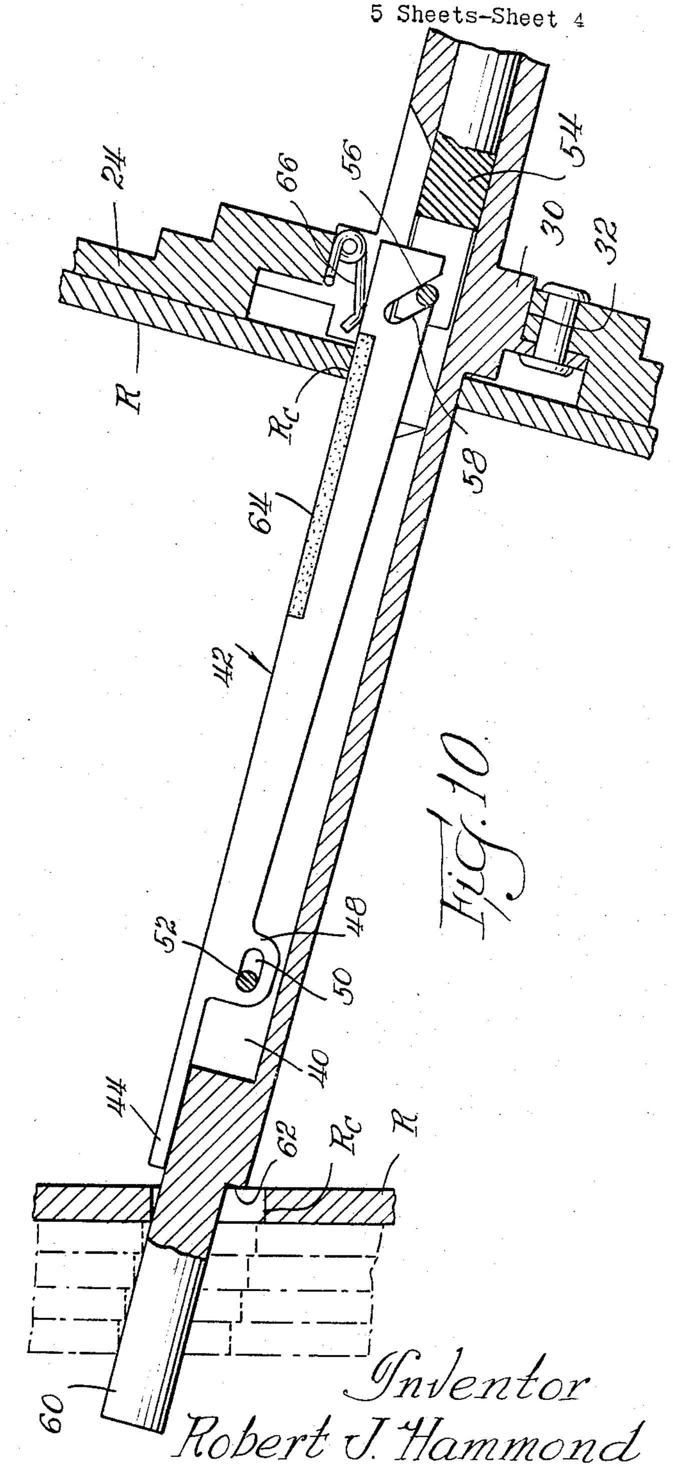
Figures 13, 14:
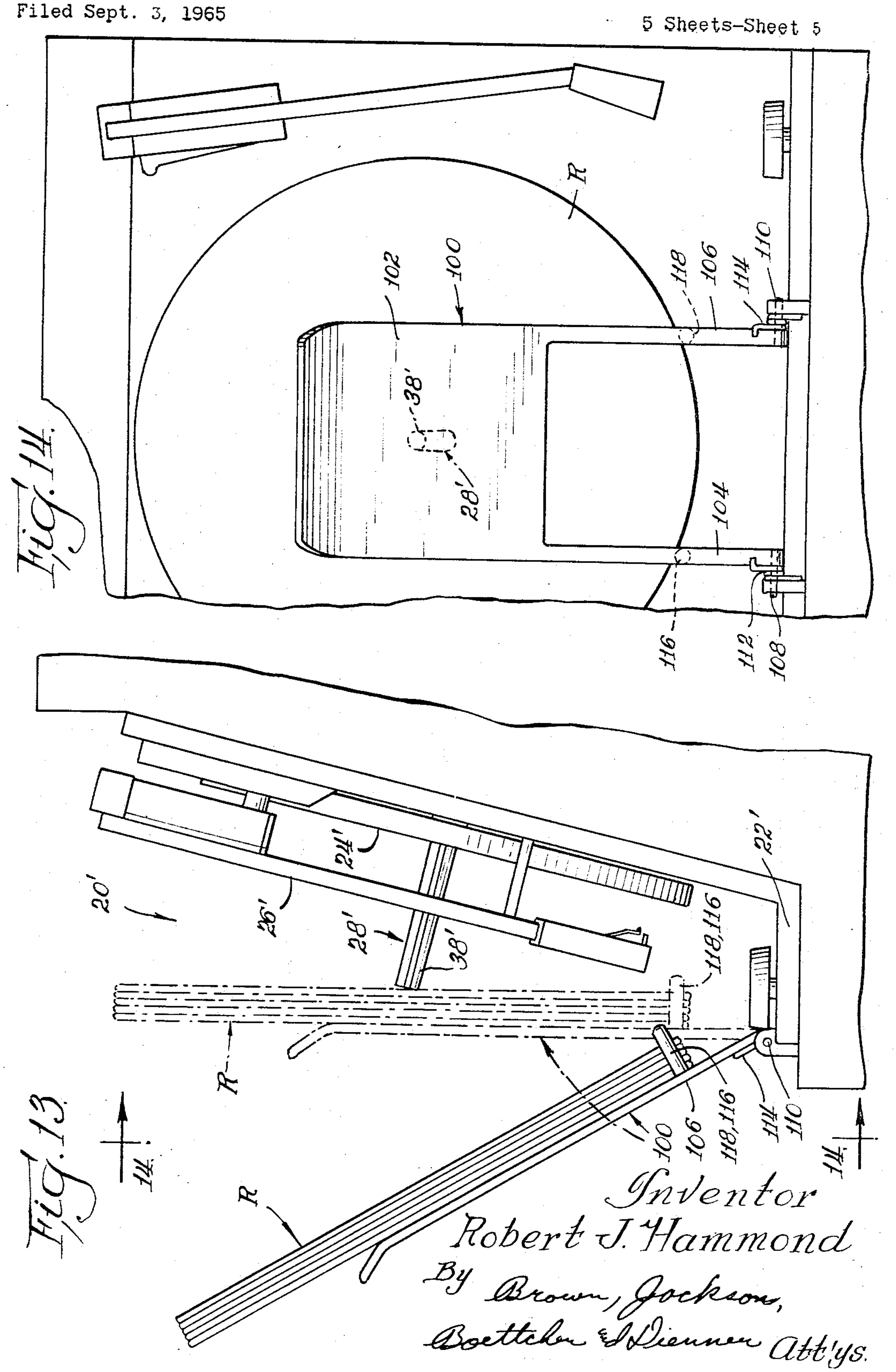

FIGURE 9 is a vertical sectional view which illustrates the dwell condition of the rotating spindle after a record has been released down the spindle and before the record has reached a playing position on the turntable, the record feeding member being retracted to an intermediate dwell position where the feeding member is inoperatively disposed and the record gripping member also being retracted to its inoperative position;

FIGURE 10 is a vertical sectional view showing the spindle in its playing position wherein the record feeding member is axially retracted to an inoperative position and the record gripping member is radially extended to grip a record which is disposed in playing position on the turntable;

FIGURE 11 is a transverse sectional view taken approximately along the line 11—11 of FIGURE 8;

FIGURE 12 is a transverse sectional view taken approximately along the line 12–12 of FIGURE 9;

FIGURE 13 is a side elevational view, partly broken away, showing an alternative embodiment of the present invention wherein a stack of records to be played is leaned against the upper end of the spindle and supported by a record stabilizer member; and FIGURE 14 is a front elevational view, partly broken away, looking approximately in the direction of the arrows 14—14 of FIGURE 13.

Referring now to the drawings, there is shown a record changer 20 comprising a base member 22, a turntable 24, a tone arm 26 and a spindle 28. In the embodiment shown, the plane of the turntable 24 is inclined at approximately 13 degrees from the vertical, and the axis of the spindle 28 is perpendicular to the turntable and inclined at approximately 13 degrees from the horizontal. While the record changer spindle 28 of the present invention is intended for use with an inclined record changer of the type where the spindle axis is inclined away from the vertical, it will be understood that the particular angle of inclination is not critical and may be varied depending upon the cabinet space available for the record changer as well as other considerations. It should also be noted that terms such as "upper," "lower," "upwardly," "downwardly" and words of like import will be used herein and in the appended claims as if the spindle were vertically disposed, and thus "upwardly" will mean away from the turntable and "downwardly" will mean toward the turntable.

Referring now to FIGURES 2–5, the spindle 28 has a hub 30 at its lower end which fits within a central opening 32 in the turntable 24, and an annular flange 34 on the hub is fixedly secured to the turntable by rivets or the like as shown at 36 that the spindle will rotate conjointly with the turntable. A spindle body 38 extends upwardly from the turntable 24 and has a longitudinal slot 40 formed in one side thereof in which there is positioned a unitary record actuator member 42. The upper end of the actuator 42 comprises a record lifter arm or feeding member 44, and the lower end of the actuator comprises a record gripping member 46. The actuator 42 has a lug 48 formed thereon proximate its upper end, and a short longitudinal slot 50 is formed in the lug to accommodate a cross pin 52. The cross pin 52 is fixedly carried by the spindle body 38 and serves to guide the upper end of the actuator 42 and limit the longitudinal movement thereof in the slot 40. A central rod member 54 is disposed within a bore 55 in the lower end of the spindle body 38 for vertical movement therein, and the upper end of the rod 54 carries a pin 56 which rides in an inclined slot 58 formed in one side of the actuator 42 adjacent the lower end thereof. As will be described more fully hereinafter, vertical movement of the rod 54 and pin 56 control movement of the record actuator 42 which in turn effects release of a record to the turntable 24 at the proper time and serves to grip a record in playing position on the turntable to assure that the record rotates conjointly with the turntable and the spindle 28.

The upper end of the spindle body 38 is provided with a reduced diameter extension 60 which in the embodiment being described serves to support a plurality of records R to be played. Thus, the records are mounted over the spindle extension 60 so as to be suspended thereon, and the bottom record in the stack bears against an annular shoulder 62 at the lower end of the reduced diameter extension 60 so as to be prevented from falling down the spindle 28. It will be understood that the spindle 28 rotates with the turntable 24, while the records supported on the spindle extension 60 tend to remain stationary as the extension rotates within the record centerholes. The records are prevented from falling to the turntable by the annular shoulder 62, and when it is desired to supply a new record to the turntable for playing the lowermost record on the extension 60 is lifted over the shoulder 62 and permitted to slide down the spindle in a manner to be described hereinbelow.

Figures 2, 3, 4, 5:
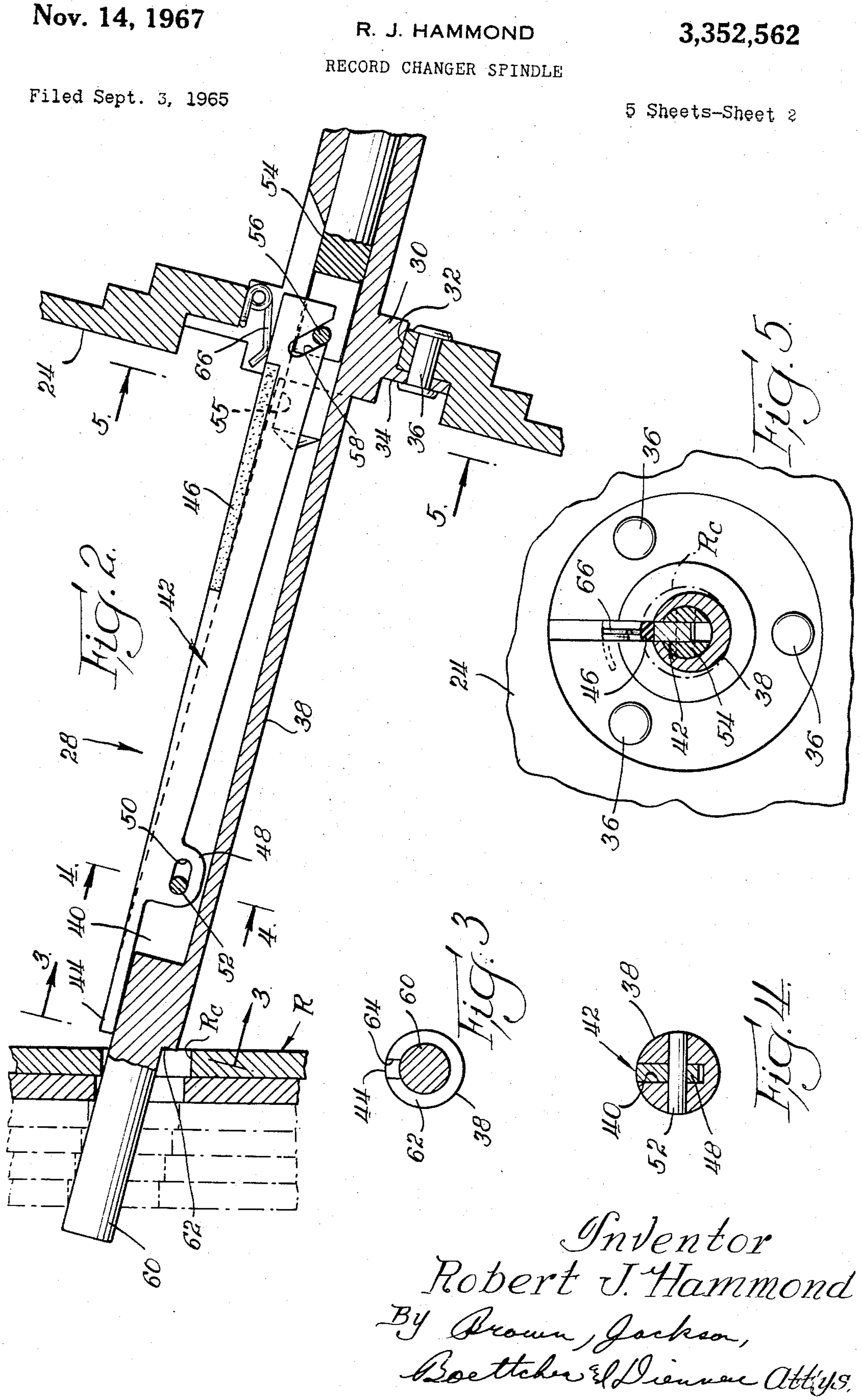
FIGURE 2 is an enlarged fragmentary vertical sectional view of the record changer spindle of FIGURE 1 showing a record lifter or feeding member in its normal inoperative position and showing a record gripping member in its normal operative position wherein it will grip a record in playing position on the turntable.
FIGURE 3 is a transverse sectional view taken approximately along the line 3—3 of FIGURE 2.
FIGURE 4 is a transverse sectional view taken approximately along the line 4—4 of FIGURE 2.
FIGURE 5 is a transverse sectional view, partly in elevation and partly broken away, taken approximately along the line 5—5 of FIGURE 2.

The longitudinal slot 40 in the side of the spindle body 38 includes a slot portion 64 (see FIGURE 3) of reduced depth which extends upwardly to the shoulder 62 and accommodates therein the record lifter arm 44 of the record actuator 42. The normal position of the record actuator 42 is as shown in FIGURES 2 and 6 wherein the upper end of the lifter arm 44 is approximately flush with the annular shoulder 62. In the foregoing normal position the lifter arm is inoperative and the spindle 28 will rotate continuously while the records R on the spindle extension 60 will remain held thereon by the shoulder 62. When it is desired to feed one record down the spindle to the turntable 24, the record actuator 42 is moved to its upper position as shown in FIGURE 7 wherein the end of the lifter arm 44 projects beyond the annular shoulder 62 by an amount not exceeding the thickness of one of the records R.

It is important to note that the movement of the lifter arm 44 to its extended operative position is timed relative to the rotation of the spindle 28, and thus the lifter arm is extended when the spindle 28 is in the rotary position of FIGURE 7 with the lifter arm aligned with the underside of the record centerhole $R_c$. By extending the lifter arm 44 in the foregoing manner, there is ample space to permit the lifter arm to extend inside the record centerhole $R_c$, and thus as the spindle 28 continues to rotate an additional 180 degrees to the position of FIGURE 8, the lifter arm 44 will lift the lowermost record R over the shoulder 62 so that the record will slide down the spindle to the turntable 24 for playing. It may be found desirable to provide a record stabilizer arm which overlies the uppermost record in the stack of records on the spindle extension 60 and urges the records toward the turntable 24, since such a stabilizer arm will assure that a record to be released will not hang on the end of the lifter arm 44 when the release position of FIGURE 8 is reached. One example of a stabilizer arm will be described later herein in conjunction with the embodiment of FIGURES 13 and 14.

When a record R has been released to the turntable 24 for playing in the manner described above, it is desirable to provide for gripping of such a record to assure that it will rotate conjointly with the turntable. This is particularly important where as with the present invention the spindle 28 is tilted away from a vertical axis since the gravity force present to urge the record against the rotating turntable is substantially reduced. In the embodiment being described there is provided the gripper member 46 which comprises a resilient pad movable generally radially outwardly and inwardly between gripping and non-gripping positions. When the central rod 54 which carries the pin 56 is in its normal lowermost position as shown in FIGURES 2 and 10, the pin 56 by its cooperation with the inclined slot 58 will cause the gripping member 56 to be in its radially extended position wherein it will project radially beyond the adjacent side of the spindle body 38 and pull any records on the turntable 24 against the opposite side of the spindle body. In this manner the records on the turntable are fixedly secured to the rotating spindle body 38 and are thus assured of rotating conjointly with the turntable. When the central rod 54 is moved upwardly so as to extend the record lifter arm 44 axially, the upward movement of the pin 56 in the slot 58 will retract the gripping member 46 to the position FIGURE 7 where it no longer projects radially outwardly of the spindle wall 38. A spring 66 is also provided for bearing against the lower end of the record actuator 42 so as to bias the gripping portion 46 thereof toward its radially retracted position, as will be explained more fully hereinbelow.

The operation of the embodiment of FIGURES 1–12 will now be described. A plurality of records R are hung on the spindle extension 60 so as to lean against the shoulder 62, and if desired a stabilizer arm (not shown) may be positioned to overlie the uppermost record so as to urge the record stack toward the turntable 24 and thereby stabilize the records. The turntable 24 and spindle 28 rotate together, and in order to release one record to the turntable for playing the central rod 54 is moved from the position of FIGURE 2 to the position of FIGURE 7 causing upward movement of the pin 56. As the pin 56 moves upwardly in the inclined slot 58 to the position of FIGURE 7, it causes radial retraction of the gripper member 46 and axial extension of the lifter finger 44. It is important to note that such movement occurs when the spindle 28 is in the rotary position shown in FIGURE 7 so that the lifter 44 will be able to enter into the underside of the centerhole $R_c$ of the lowermost record on the spindle extension 60.

As the spindle 28 rotates 180 degrees from the position of FIGURE 7 to the position of FIGURE 8, the extended lifter arm 44 lifts the lowermost record in the stack over the shoulder 62 causing the record to slide down the spindle toward the turntable 24. The central rod 54 and pin 56 are then moved downwardly to the position of FIGURE 9 which is an intermediate or dwell position in which the lifter arm 44 is axially retracted and the gripper 46 is still radially retracted. Such movement of the record actautor 42 is produced after one revolution of the spindle 28 with the lifter arm 44 in its upper axially extended position. Thus, as described above the actuator 42 is moved upwardly when the spindle 28 is in the rotary position of FIGURE 7, and it will be understood that the actuator 42 will remain in its upper position for approximately one revolution of the spindle 28, after which the actuator will be moved to the dwell position of FIGURE 9.

The purpose of retracting the lifter arm 44 after approximately one revolution of the spindle 28 is to prevent the lifter arm from continuing to release additional records down the spindle, and yet because the one record which is released will not normally have reached the turntable 24 after one revolution of the spindle 28 the gripper 46 must be maintained in its radially retracted position for an additional period of time. It will be noted that when the central rod 54 and pin 56 are moved to the dwell position of FIGURE 9, the spring 66 maintains the gripping member 46 retracted and assures that the limited movement of the pin 56 will serve only to axially retract the lifter arm 44. After a few additional revolutions of the spindle 28, the predetermined number being whatever is necessary to assure that the released record has reached a playing position on the turntable 24, the central rod 54 and pin 56 are moved to their normal fully down position as shown in FIGURE 10 whereby the pin 56 overcomes the spring 66 and produces radial extension of the gripper 46 in order to grip the record which is in playing position on the turntable. When it is desired to release a further record to the turntable 24, the rod 54 and pin 56 are again raised to the position of FIGURE 7 and the foregoing cycle is repeated. A different type of record gripping member which may be used to advantage in conjunction with the record lifter means of the present invention is described in the copending application of Michael H. Estkowski, Ser. No. 484,895, filed of even date herewith, and assigned to the assignee of the present invention.

Figure 1:
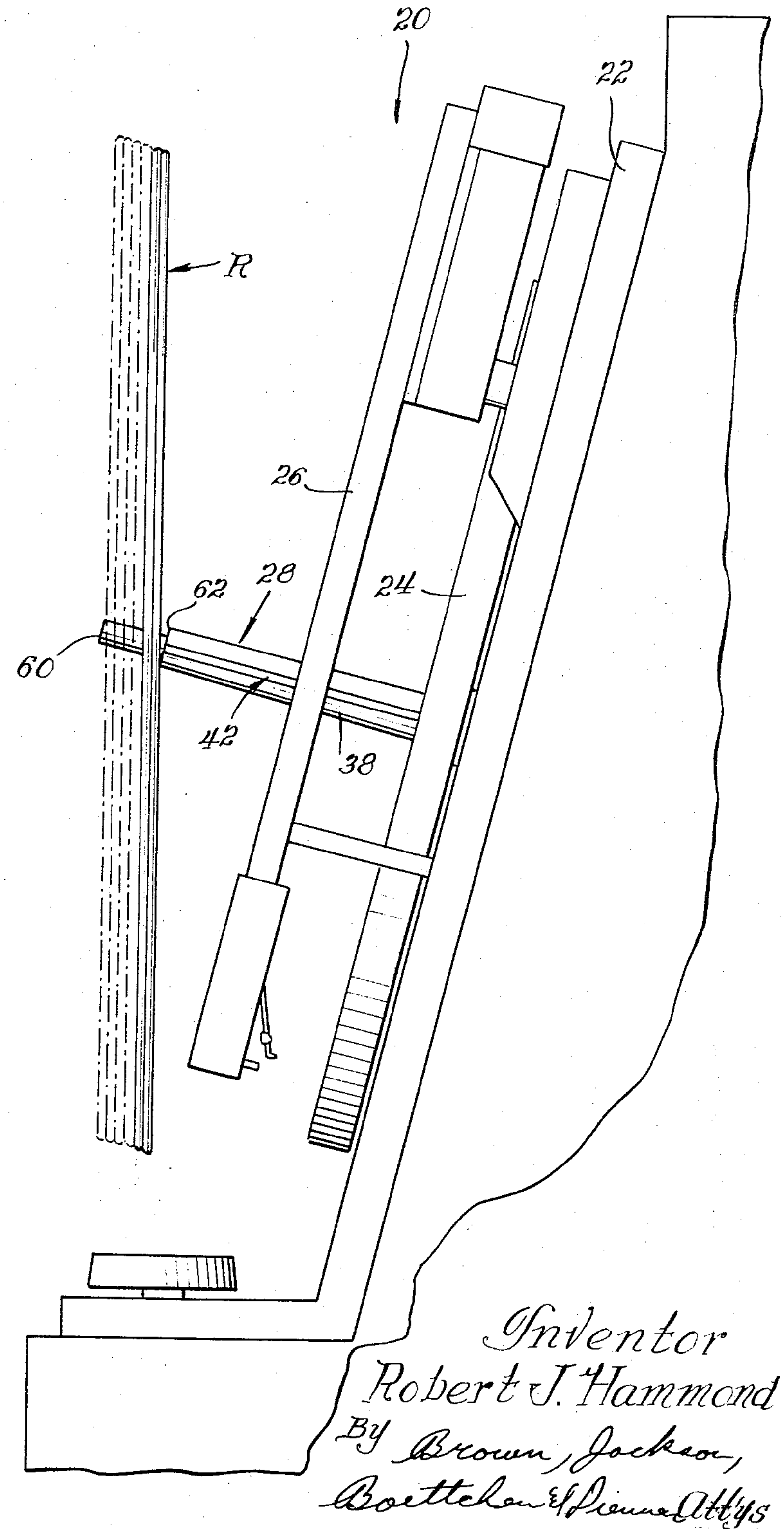
FIGURE 1 is a side elevational view, partly broken away, showing a record changer embodying a spindle constructed in accordance with the present invention, there being shown a plurality of records disposed on an upper storage portion of the spindle.

FIGURES 13 and 14 illustrate an alternative embodiment of the present invention wherein the reduced diameter spindle extension member 60 is eliminated and a stack of records R to be played are supported on a record stabilizer member 100 so as to lean against the end of a spindle 28′. The stabilizer member 100 comprises a main stabilizer plate 102 having a pair of legs 104 and 106 which are pivotally mounted at a record changer base 22′ by pivot pins 108 and 110 respectively. A pair of torsion springs 112 and 114 are provided at the ends of the arms 104 and 106 to bias the stabilizer 100 in a clockwise direction as viewed in FIGURE 13. The arm 104 carries a stud or pin 116, and the arm 106 carries a similar stud or pin 118. A stack of records R to be played is positioned on top of the two studs 116 and 118, and then the stabilizer member 100 is tilted in a clockwise direction to the position shown in dashed lines in FIGURE 13 thereby causing the stack of records to lean against the end of the spindle body 38′. The studs 116 and 118 are located so that the position of the records R relative to the spindle body 38′ will be substantially the same as shown in the embodiment of FIGURE 1, even though the reduced diameter spindle extension 60 is eliminated in the present embodiment. Thus, the records in the dash line position of FIGURE 13 will be located slightly out of alignment with the spindle body 38′ substantially as shown in FIGURE 2, and the records will be lifted one at a time and released down the spindle in the same manner as is described in conjunction with the embodiment of FIGURES 1–12. The use of the stabilizer member 100 to support the stack of records is not in itself claimed as my invention but is illustrated to show that the record lifting means of my invention is not limited to the use of the reduced diameter spindle extension 60 for supporting the records and may be used in conjunction with various other record supporting means.

While I have described my invention in certain preferred forms. I do not intend to be limited to such forms except insofar as the appended claims are so limited, since modifications within the scope of my invention will readily occur to others, particularly with my disclosure before them.

I claim:

1. The combination of a record changer spindle of the type which is fixedly secured to a turntable for conjoint rotation therewith, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short generally radial movement relative to said body in order to permit it to slide down said spindle body to a turntable for playing, an opening in the side of said spindle body which extends up to said upper end thereof, a record feeding member carried by said rotatable spindle body in said opening for axial movement relative to said spindle body between an extended position wherein said feeding member projects axially beyond said upper end and to at least the radial distance of said side of the upper end of the spindle body from the axis of said spindle body and a normal retracted non-projecting position, and means for temporarily moving said feeding member to its extended position when said feeding member is adjacent said exposed portion of the record centerhole of said adjacent record whereby said feeding member will be extended into said record centerhole and as said spindle body rotates will move said adjacent record generally radially over said upper end of said spindle body and thereby permit the record to fall down said spindle body to the turntable for playing.

2. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, an opening in the side of said spindle body which extends up to said upper end thereof, a record lifter member carried by said rotatable spindle body in said opening for axial movement relative to said spindle body between an extended position wherein said lifter member projects axially beyond said upper end and to at least the radial distance of said side of the upper end of the spindle body from the axis of said spindle body and a normal retracted non-projecting position, and means for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing.

3. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, an opening in the side of said spindle body which extends up to said upper end thereof, a record lifter member carried by said rotatable spindle body in said opening for axial movement relative to said spindle body between an extended position wherein said lifter member projects axially beyond said upper end of said spindle body and a normal retracted non-projecting position, said lifter member having a radially outer lifting surface which is approximately flush with an adjacent peripheral wall portion of said spindle body, and means for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing.

4. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, a narrow longitudinal slot in one side of said spindle body which extends up to said upper end thereof, a record lifter member carried by said rotatable spindle body in said longitudinal slot for axial movement relative to said spindle body between an extended position wherein said lifter member projects axially beyond said upper end and to at least the radial distance of said side of the upper end of the spindle body from the axis of said spindle body and a normal retracted non-projecting position, and means for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing.

5. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, an opening in the side of said spindle body which extends up to said upper end thereof, a record lifter member carried by said rotatable spindle body in said opening for axial movement relative to said spindle body between an extended position wherein said lifter member projects axially beyond said upper end of said spindle body by an amount not exceeding the thickness of one of said records and to at least the radial distance of said side of the upper end of the spindle body from the axis of said spindle body and a normal retracted non-projecting position, and means for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing.

6. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, an opening in the side of said spindle body which extends up to said upper end thereof, a record lifter member carried by said rotatable spindle body in said opening for axial movement relative to said spindle body between an extended position wherein said lifter member projects axially beyond said upper end and to at least the radial distance of said side of the upper end of the spindle body from the axis of said spindle body and a normal retracted non-projecting position, and control means axially movable in said spindle body to an operative position for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing, said control means being movable out of said operative position after approximately one revolution of said spindle body in order to prevent additional records from being released down said spindle body.

7. The combination of a record changer spindle of the type which is fixedly secured to a turntable for conjoint rotation therewith and which is inclined at a substantial angle from a vertical axis, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short lift relative to said body in order to permit it to slide down said spindle body to a turntable for playing, a narrow longitudinal slot in one side of said spindle body which extends up to said upper end thereof, a record lifter member carried by said rotatable spindle body in said longitudinal slot for axial movement relative to said spindle body between an extended position wherein said lifter member projects axially beyond said upper end of said spindle body by an amount not exceeding the thickness of one of said records and a normal retracted non-projecting position, said lifter member having a radially outer lifting surface which is approximately flush with an adjacent peripheral wall portion of said spindle body, and control means axially movable in said spindle body to an operative position for temporarily moving said lifter member to its extended position when said lifter member is adjacent said exposed portion of the record centerhole of said adjacent record whereby said lifter member will be extended into said record centerhole and as said spindle body rotates will lift said adjacent record over said upper end of said spindle body and thereby permit the record to fall down said spindle body to the turntable for playing, said control means being movable out of said operative position after approximately one revolution of said spindle body in order to prevent additional records from being released down said spindle body.

8. The combination of a record changer spindle of the type which is fixedly secured to a turntable for conjoint rotation therewith, and means for supporting a plurality of records in a position where said spindle rotates with respect to said records the improvement comprising, in combination, a rotatable spindle body with an upper end acting as a bearing surface, said means for supporting a plurality of records maintaining said records in a storage position with the centerhole of the record adjacent said bearing surface radially offset with respect to said spindle body so that a portion of said centerhole is exposed and with said adjacent record bearing against said upper end of said spindle body, the amount of offset being such that said adjacent record requires a short generally radial movement relative to said body in order to permit it to slide down said spindle body to a turntable for playing, a longitudinal opening in the side of said spindle body which extends up to said upper end thereof, a record actuator member carried by said rotatable spindle body in said opening and having at its upper end a record feeding member and at its lower end a record gripping member, said actuator being generally axially movable relative to said spindle body between an upper actuator position wherein said feeding member projects axially beyond said upper end and to at least the radial distance of said side of the upper end of the spindle body from the axis of said spindle body and said gripping member is in a radially retracted non-gripping position and a lower actuator position wherein said feeding member is in a retracted non-projecting position and said gripping member is in a radially extended gripping position wherein it grips a record in playing position on the turntable, and means for temporarily moving said record actuator to its upper position when said feeding member is adjacent said exposed portion of the record centerhole of said adjacent record whereby said gripping member will be radially retracted and said feeding member will be axially extended into said record centerhole and as said spindle body rotates said feeding member will move said adjacent record generally radially over said upper end of said spindle body and thereby permit the record to fall down said spindle body to the turntable for playing.

9. The invention of claim 8 wherein said spindle body is inclined at a substantial angle from a vertical axis and said feeding member when axially extended serves to lift said adjacent record over said upper end of said spindle body and thereby permit the record to fall down said spindle body to the turntable for playing.

10. The invention of claim 8 wherein said means for moving said record actuator comprises control means axially movable in said spindle body for first moving said record actuator to its upper position in order to retract said gripping member and extend said feeding member to release one record down the spindle, then moving said record actuator to an intermediate dwell position to retract both said feeding member and said gripping member while said record is falling to the turntable, and finally moving said record actuator to its lower position to move said gripping member to its radially extended gripping position to grip said record in playing position on the turntable.

No references cited.

LEONARD FORMAN, *Primary Examiner.*

JOEL M. FREED, *Assistant Examiner.*